US012737901B2

(12) United States Patent
Lee et al.

(10) Patent No.: US 12,737,901 B2
(45) Date of Patent: Sep. 15, 2026

(54) SYSTEM AND METHOD FOR MEASURING WATER DEPTH USING RADAR IMAGE PROCESSING

(71) Applicant: KOREA INSTITUTE OF OCEAN SCIENCE & TECHNOLOGY, Busan (KR)

(72) Inventors: Moonjin Lee, Daejeon (KR); Tae Sung Kim, Daejeon (KR); Yong Myung Kim, Daejeon (KR)

(73) Assignee: KOREA INSTITUTE OF OCEAN SCIENCE & TECHNOLOGY, Busan (KR)

( * ) Notice: Subject to any disclaimer, the term of this patent is extended or adjusted under 35 U.S.C. 154(b) by 255 days.

(21) Appl. No.: 18/604,107

(22) Filed: Mar. 13, 2024

(65) Prior Publication Data

US 2024/0354976 A1 Oct. 24, 2024

(30) Foreign Application Priority Data

Apr. 21, 2023 (KR) ........................ 10-2023-0052631

(51) Int. Cl.
*G06T 7/50* (2017.01)
*G01S 13/90* (2006.01)
*G06T 5/10* (2006.01)

(52) U.S. Cl.
CPC ................ *G06T 7/50* (2017.01); *G01S 13/90* (2013.01); *G01S 13/9021* (2019.05); *G06T 5/10* (2013.01);

(Continued)

(58) Field of Classification Search
CPC ................... G06T 5/10; G06T 7/50–94; G06T 2207/10028; G06T 2207/10044;

(Continued)

(56) References Cited

U.S. PATENT DOCUMENTS 8,903,134 B2 * 12/2014 Abileah ................. G06V 20/13 382/106
11,249,185 B2 * 2/2022 Kawanami ............ G01S 13/956

(Continued)

FOREIGN PATENT DOCUMENTS

CN 108120981 A * 6/2018 ............ G01S 13/90
KR 10-1531906 B1 6/2015

(Continued)

OTHER PUBLICATIONS

Alpers, W. and Hennings, I. "A theory of the imaging mechanism of underwater bottom topography by real and synthetic aperture radar." Journal of Geophysical Research: Oceans, 89(C6), pp. 10529-10546 (Year: 1984).*

(Continued)

*Primary Examiner* — Scott A Rogers
(74) *Attorney, Agent, or Firm* — Dinsmore & Shohl LLP; Yongsok Choi, Esq.

(57) ABSTRACT

Provided are an apparatus and a method for measuring water depth. In order to solve a problem of water depth measurement apparatuses and methods in the related art, provided are a system and a method for measuring water depth using radar image processing, wherein an underwater environment, such as the shape of a seafloor surface, is more accurately recognized through analysis of a SAR image using synthetic-aperture radar (SAR), and thus, more efficient and accurate water depth measurement is achieved for a wide region with a relatively simple configuration and low cost.

12 Claims, 4 Drawing Sheets

(52) U.S. Cl.
CPC ............... *G06T 2207/10028* (2013.01); *G06T 2207/10044* (2013.01); *G06T 2207/20056* (2013.01); *G06T 2207/30181* (2013.01)

(58) Field of Classification Search
CPC . G06T 2207/20056; G06T 2207/30181; G01S 13/90–9094
See application file for complete search history.

(56) References Cited

U.S. PATENT DOCUMENTS

| | | | | |
|---|---|---|---|---|
| 11,854,258 | B1 * | 12/2023 | Murphy | G06T 7/73 |
| 2007/0242884 | A1 * | 10/2007 | Dugan | G06V 20/13<br>382/190 |

FOREIGN PATENT DOCUMENTS

| | | | | |
|---|---|---|---|---|
| KR | 10-1548198 | B1 | 9/2015 | |
| KR | 10-2016-0072432 | A | 6/2016 | |
| KR | 10-2280898 | B1 | 7/2021 | |
| KR | 10-2297054 | B1 | 9/2021 | |
| WO | WO-2024008365 | A1 * | 1/2024 | G01S 13/885 |

OTHER PUBLICATIONS

Mudiyanselage, S.D., Wilkinson, B. and Abd-Elrahman, A. "Automated high-resolution bathymetry from Sentinel-1 SAR images in deeper nearshore coastal waters in eastern Florida." Remote Sensing, 16(1), p. 1 (Year: 2023).*

Pleskachevsky, A. and Lehner, S., Feb. 2011. "Estimation of underwater topography using satellite high resolution synthetic aperture radar data." In Proceedings of the 4th TerraSAR-X Meeting, pp. 1-19 (Year: 2011).*

Pleskachevsky, A., Lehner, S., Heege, T. and Mott, C. "Synergy and fusion of optical and synthetic aperture radar satellite data for underwater topography estimation in coastal areas." Ocean Dynamics, 61(12), pp. 2099-2120 (Year: 2011).*

Wiehle, S., Pleskachevsky, A. and Gebhardt, C. "Automatic bathymetry retrieval from SAR images." CEAS Space Journal, 11(1), pp. 105-114 (Year: 2019).*

Wiehle, S. and Pleskachevsky, A., Jun. 2018. "Bathymetry derived from sentinel-1 synthetic aperture radar data." In EUSAR 2018; 12th European conference on synthetic aperture radar, pp. 1-4, VDE (Year: 2018).*

Written Opinion from the Korean Ministry of Intellectual Property (MOIP) dated Jun. 21, 2023 for application No. 10-2023-0052631 A (Year: 2023).*

* cited by examiner

SYSTEM AND METHOD FOR MEASURING WATER DEPTH USING RADAR IMAGE PROCESSING

CROSS REFERENCE TO RELATED APPLICATION

The present application claims priority to Korean Patent Application No. 10-2023-0052631, filed 21 Apr. 2023, the entire contents of which is incorporated herein for all purposes by this reference.

BACKGROUND OF THE INVENTION

Field of the Invention

The present disclosure relates to an apparatus and a method for measuring water depth. More particularly, the present disclosure relates to a system and a method for measuring water depth using radar image processing, wherein the system and the method are capable of measuring water depth in a relatively wide region more efficiently and accurately through image analysis using radar, thereby solving a problem of water depth measurement apparatuses and methods in the related art. The problem is that in general, a measurement apparatus is installed at a position at which water depth is to be measured and then measures water depth, which is inconvenient in measuring water depth at multiple measurement points or in a relatively wide region because this requires carrying the measurement apparatus to each of the positions and repeating measurement.

In addition, the present disclosure relates to a system and a method for measuring water depth using radar image processing, wherein an underwater environment, such as the shape of a seafloor surface, is more accurately recognized through analysis of a SAR image using synthetic-aperture radar (SAR), and thus, more efficient and accurate water depth measurement is achieved for a wide region with a relatively simple configuration and low cost, thereby solving a problem of water depth measurement apparatuses and methods in the related art. The problem is that as described above, in order to measure water depth in a particular region, moving to multiple measurement points is required and water depth measurement is repeated and an average value is obtained, but in general, most rivers or lakes and the seafloor have uneven bottoms and it is difficult to determine underwater situations or environments during water depth measurement, so there is a limitation that the accuracy or reliability of measurement results is not guaranteed.

DESCRIPTION OF THE RELATED ART

In general, for ocean exploration and development, it is necessary to accurately measure the water depth at the region. To this end, technical details of various water depth measurement apparatuses and methods have been proposed.

That is, for example, as proposed in Korean Patent No. 10-2280898 "DEPTH MEASUREMENT APPARATUS FOR WATERGATE AREA OF SEAWATER INTAKE STRUCTURE AND DEPTH MEASUREMENT METHOD THEREOF" and Korean Patent No. 10-1548198 "DEPTH FINDER", various apparatuses and methods for water depth measurement have been proposed in the related art.

However, the water depth measurement apparatuses and methods in the related art generally use a direct measurement way in which a measurement apparatus is installed at a position at which water depth is to be measured and measures water depth. For example, in order to measure water depth at multiple measurement points or a relatively wide region, a measurement apparatus needs to be carried to each of the positions and repeats measurement, which is inconvenient.

Furthermore, in general, most rivers or lakes and the seafloor have uneven bottoms. Therefore, in order to measure the water depth in a particular region, moving to multiple measurement points is required and water depth measurement is repeated and an average value is obtained. However, the water depth measurement apparatuses and methods in the related art have a limitation that the accuracy or reliability of measurement results is not guaranteed because it is difficult to determine underwater situations or environments during water depth measurement.

Therefore, in order to solve the limitation of the water depth measurement apparatuses and methods in the related art, it is preferable to propose a new system and method for measuring water depth using radar image processing, wherein the system and the method are capable of recognizing an underwater environment, such as the shape of a seafloor surface, through analysis of a radar image obtained using radar, such as synthetic-aperture radar (SAR), and of measuring water depth in a relatively wide region more efficiently and accurately. However, no apparatus or method has yet been proposed that satisfies all such needs.

The foregoing is intended merely to aid in the understanding of the background of the present disclosure, and is not intended to mean that the present disclosure falls within the purview of the related art that is already known to those skilled in the art.

DOCUMENTS OF RELATED ART (Patent Document 1) Korean Patent No. 10-2280898 (26 Jul. 2021); and (Patent Document 2) Korean Patent No. 10-1548198 (24 Aug. 2015)

SUMMARY OF THE INVENTION

Accordingly, the present disclosure is directed to providing a system and a method for measuring water depth using radar image processing, wherein the system and the method are capable of measuring water depth in a relatively wide region more efficiently and accurately through image analysis using radar, in order to solve a problem of water depth measurement apparatuses and methods in the related art. The problem is that in general, a measurement apparatus is installed at a position at which water depth is to be measured and then measures water depth, which is inconvenient in measuring water depth at multiple measurement points or in a relatively wide region because this requires carrying the measurement apparatus to each of the positions and repeating measurement.

In addition, the present disclosure is directed to providing a system and a method for measuring water depth using radar image processing, wherein an underwater environment, such as the shape of a seafloor surface, is more accurately recognized through analysis of a SAR image using synthetic-aperture radar (SAR), and thus, more efficient and accurate water depth measurement is achieved for a wide region with a relatively simple configuration and low cost, thereby solving a problem of water depth measurement apparatuses and methods in the related art. The problem is that as described above, in order to measure water depth in a particular region, moving to multiple measurement points is required and water depth measurement is repeated and an average value is obtained, but in general, most rivers or lakes and the seafloor have uneven bottoms and it is difficult to determine underwater situations or environments during water depth measurement, so there is a limitation that the accuracy or reliability of measurement results is not guaranteed.

According to the present disclosure, there is provided a system for measuring water depth using radar image processing, the system including: a data collector configured to receive predetermined various types of data for water depth measurement, the predetermined various types of data including a SAR image received through a synthetic-aperture radar (SAR) device; a data analyzer configured to measure water depth at a predetermined particular point or region in the SAR image through image analysis of the SAR image received through the data collector; and an output part configured to output various types of information according to predetermined settings, the various types of information including the various types of data collected through the data collector and processing processes and processing results processed through the data analyzer.

Herein, the system may further include: a communication part configured to transmit and receive the various types of data by performing communication with an external device including a server or a user terminal, through wired or wireless communication or both; and a controller configured to control overall operation of the system.

In addition, the data collector may be configured to include the synthetic-aperture radar (SAR) device, or periodically receive the SAR image according to predetermined settings from the particular or a plurality of the SAR devices installed separately from the system.

In addition, the data collector may be configured to receive the SAR image and the predetermined various types of data for water depth measurement including information on sea surface and undersea environments, information on a period (T) and a wavelength (L) of a wave, and current atmospheric temperature, water temperature, wind direction, wind speed, and weather information for the region at which the water depth is to be measured, and store water depth measurement results and respective pieces of the data in the form of a database according to predetermined settings to establish a water depth measurement-related database for each region.

In addition, the data analyzer may be configured to make a connection between the water depth and a tidal rate and brightness (an intensity of a radar reflection wave) of the SAR image and prestore the connection as reference data for water depth measurement, and estimate a shape of seafloor topography on the basis of a change in the brightness of the SAR image and a change in the tidal rate received through the data collector and make comparison with the reference data to measure the water depth in the particular point or region according to predetermined settings.

In addition, the data analyzer may be configured to calculate, on the basis of information on a period (T) and a wavelength (L) of a wave in the measurement region received through the data collector and a dispersion relation equation of surface gravity waves, the water depth (h) using Equation below $$h = \frac{1}{k}\tanh^{-1}\left(\frac{\omega^2}{gk}\right)$$

(Herein, h denotes the water depth, k denotes a wavenumber ($k=2\pi/L$), ω denotes an angular frequency ($\omega=2\pi/T$), and g denotes gravitational acceleration).

In addition, the data analyzer may be configured to apply 2D fast Fourier transform (FFT) to the SAR image received through the data collector, and calculate the wavenumber from wavenumber vector components ($k_x$, $k_y$) in x and y directions in a 2D spectrum and determine a wavelength of a swell using Equation below $$k = k_x^2 + k_y^2$$

$$\omega = \frac{2\pi}{\sqrt{k_x^2 + k_y^2}}$$

$$\theta = \tan^{-1}\left(\frac{k_y}{k_x}\right)$$

$$\sin\theta = \frac{\lambda}{2L} \text{ or } L = \frac{\lambda}{2\sin\theta}$$

(herein, L denotes a wavelength of a sea level wave, and A denotes a wavelength of a radar wave).

In addition, the data analyzer may be configured to determine, when the SAR image includes deep-water where the water depth exceeds ½ of the wavelength (L), the period (T) using Equation below $$\omega = \sqrt{gk}$$

$$T = \sqrt{\frac{2\pi\lambda}{g}}.$$

In addition, the output part may be configured to visually display, through a monitor or a display, the various types of information including the SAR image and the various types of data received through the data collector and the processing processes and the analysis results of the data analyzer.

Alternatively, the output part may be configured to display the various types of information visually through the monitor or the display, and simultaneously convey the various types of information audibly through a voice output means including a speaker.

In addition, the controller may be configured to transmit the various types of information including the SAR image and the various types of data received through the data collector and the processing processes and the analysis results of the data analyzer, to the external device including the server or the user terminal through the communication part according to predetermined settings.

In addition, according to the present disclosure, there is provided a method for measuring water depth using radar image processing, the method including: realizing a system for measuring water depth at a particular point or region from a SAR image in a system establishment step; and receiving a SAR image and measuring water depth by using the system in a water depth measurement step, wherein the system for measuring water depth is configured to using the above-described system for measuring water depth using radar image processing.

In addition, according to the present disclosure, there is provided a water depth measurement information provision service system including: water depth measurement information generators configured to establish databases by collecting water depth measurement results and various types of information related to water depth measurement for respective regions; user terminals for respective users to make requests for information related to water depth measurement and receive corresponding services; and a service server connected to each of the water depth measurement information generators and the user terminals, and configured to receive various types of data including the water depth measurement results from the respective water depth measurement information generators, and provide the corresponding services at the users' requests received from the respective user terminals, wherein the water depth measurement information generators are configured using the above-described system for measuring water depth using radar image processing.

Herein, the user terminals may include personal portable information communication terminals including smartphones or tablet PCs, or information processing devices PCs or laptop computers, or all.

As described above, the present disclosure provides the system and the method for measuring water depth using radar image processing, wherein the system and the method are capable of water depth measurement through analysis of a SAR image using synthetic-aperture radar (SAR), so that an underwater environment, such as the shape of a seafloor surface, can be more accurately recognized with a relatively simple configuration and low cost, and more efficient and accurate water depth measurement can be achieved for a wide region.

In addition, the present disclosure provides the system and the method for measuring water depth using radar image processing, wherein the system and the method are capable of measuring water depth more efficiently and accurately through analysis of a SAR image as described above, thereby solving a problem of the water depth measurement apparatuses and methods in the related art. The problem is that in general, a measurement apparatus is installed at a position at which water depth is to be measured and then measures water depth, which is inconvenient in measuring water depth at multiple measurement points or in a relatively wide region because this requires carrying the measurement apparatus to each of the positions and repeating measurement.

In addition, the present disclosure provides the system and the method for measuring water depth using radar image processing, wherein the system and the method are capable of measuring water depth more efficiently and accurately through analysis of a SAR image as described above, thereby solving a problem of the water depth measurement apparatuses and methods in the related art. The problem is that in order to measure water depth in a particular region, moving to multiple measurement points is required and water depth measurement is repeated and an average value is obtained, but in general, most rivers or lakes and the seafloor have uneven bottoms and it is difficult to determine underwater situations or environments during water depth measurement, so there is a limitation that the accuracy or reliability of measurement results is not guaranteed.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, a system and a method for measuring water depth using radar image processing according to embodiments of the present disclosure will be described with reference to the accompanying drawings.

Here, it should be noted that the following description is merely one exemplary embodiment to carry out the present disclosure, but the present disclosure is not limited to the exemplary embodiments which will be described below.

Further, it should be noted that in the following description of the exemplary embodiment of the present disclosure, when it is determined that a portion is the same as or similar to that of the related art or easily understood and carried out by those skilled in the art, a detailed description thereof will be omitted for simplifying the description.

Next, specific details of a system and a method for measuring water depth using radar image processing according to the present disclosure will be described with reference to the drawings.

Figure 1:
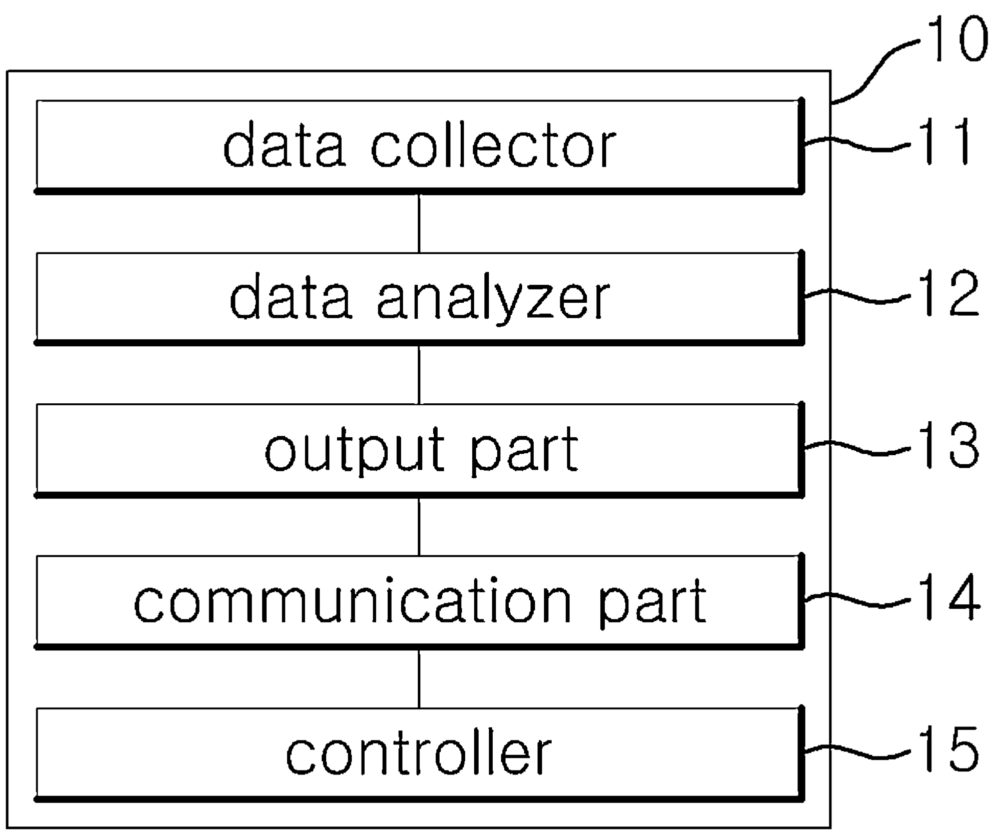
FIG. 1 is a block diagram schematically illustrating the overall configuration of a system for measuring water depth using radar image processing according to an embodiment of the present disclosure.

More specifically, referring to FIG. 1 first, FIG. 1 is a block diagram schematically illustrating the overall configuration of a system 10 for measuring water depth using radar image processing according to an embodiment of the present disclosure.

As shown in FIG. 1, the system 10 for measuring water depth using radar image processing according to the embodiment of the present disclosure broadly includes a data collector 11, a data analyzer 12, and an output part 13. The data collector 11 receives predetermined various types of data for water depth measurement, including a SAR image received through a synthetic-aperture radar (SAR) device. The data analyzer 12 conducts image analysis on the SAR image received through the data collector 11 to measure water depth at a predetermined particular point or region in the image. The output part 13 outputs the various types of data collected through the data collector 11 and processing processes and processing results processed through the data analyzer 12, according to predetermined settings.

Herein, as shown in FIG. 1, the system 10 may further include a communication part 14, and a controller 15. The communication part 14 transmits and receives various types of data by performing communication with an external device, such as a server or a user terminal, through wired or wireless communication or both. The controller 15 controls the overall operation of each of the elements and the system 10. The controller 15 may include a processor and a memory storing instructions to be executed by the processor. Each of the data collector 11, the data analyzer 12, and the output part 13 may be program modules to be executed by the controller 15. The communication part 14 may be any communication hardware device for sending and/or receiving any wired or wireless communication.

More specifically, first, the data collector 11 may include the synthetic-aperture radar (SAR) device. Alternatively, preferably, the data collector 11 may periodically receive a SAR image according to predetermined settings from the particular or a plurality of the SAR devices installed separately from the system 10.

Herein, the data collector 11 receives, for example, the SAR image and the predetermined various types of data for water depth measurement, such as information on sea surface and undersea environments, information on the period (T) and the wavelength (L) of a wave, and current atmospheric temperature, water temperature, wind direction, wind speed, and weather information for a region at which water depth is to be measured, and stores water depth measurement results and respective pieces of the data in the form of a database according to predetermined settings to establish a water depth measurement-related database for each region.

In addition, the data analyzer 12 measures, on the basis of the SAR image received through the data collector 11, the water depth at a particular point or region from the SAR image through SAR image analysis, which will be described later.

In addition, the output part 13 visually displays, through a monitor or a display, various types of information that include the SAR image and the various types of data received through the data collector 11 as described above and the processing processes and the analysis results of the data analyzer 12.

In addition, the output part 13 displays the various types of information visually through the monitor or the display as described above, and simultaneously conveys the various types of information audibly through a voice output means, such as a speaker. That is, it is noted that the present disclosure is not necessarily limited to the configuration presented in the embodiments of the present disclosure, but can be configured in various ways by those skilled in the art without departing from the gist and scope of the present disclosure.

In addition, the system 10 transmits the various types of information that include the SAR image and the various types of data received through the data collector 11 as described above and the processing processes and the analysis results of the data analyzer 12, to an external device, such as a server or a user terminal, through the communication part 14 under control of the controller 15. Thus, a water depth measurement information provision service system and method for providing various types of information related to water depth measurement in a customized manner at users' requests can be easily realized.

Figure 2:
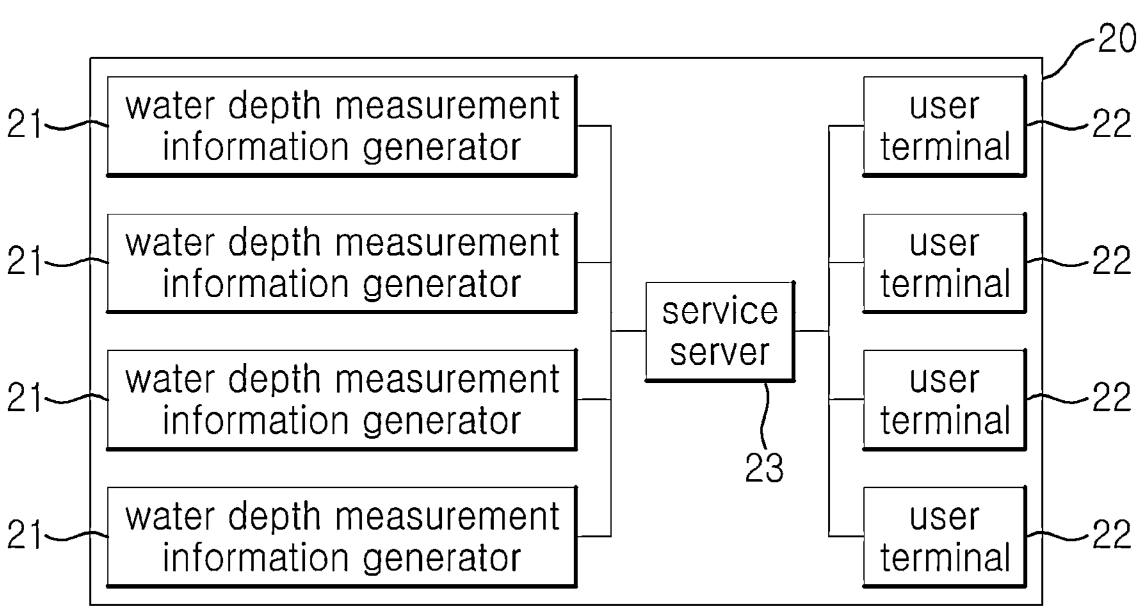
FIG. 2 is a block diagram schematically illustrating the overall configuration of a water depth measurement information provision service system for providing various types of information related to water depth measurement in a customized manner by using the system for measuring water depth using radar image processing according to the embodiment of the present disclosure shown in FIG. 1.

That is, referring to FIG. 2, FIG. 2 is a block diagram schematically illustrating the overall configuration of a water depth measurement information provision service system 20 for providing various types of information related to water depth measurement in a customized manner by using the system 10 and the method for measuring water depth using radar image processing according to the embodiments of the present disclosure.

As shown in FIG. 2, the water depth measurement information provision service system 20 according to the embodiment of the present disclosure may broadly include water depth measurement information generators 21, user terminals 22, and a service server 23. The water depth measurement information generators 21 establish databases by collecting water depth measurement results and various types of information related to water depth measurement for respective regions. The user terminals 22 are for users to make requests for information related to water depth measurement and to receive corresponding services. The service server 23 is connected to the water depth measurement information generators 21 and the user terminals 22, and receives water depth measurement results and various types of data related thereto from the respective water depth measurement information generators 21, and provides the corresponding services at the users' requests received from the respective user terminals 22.

Herein, the water depth measurement information generators 21 may be configured using the system 10 for measuring water depth using radar image processing according to the embodiment of the present disclosure, which is described above with reference to FIG. 1.

In addition, the user terminals 22 may include, for example, personal portable information communication terminals, such as smartphones or tablet PCs, or information processing devices, such as PCs or laptop computers.

Next, specific details of a water depth measurement processing process using SAR image analysis conducted by the data analyzer 12 of the system 10 for measuring water depth using radar image processing according to the embodiment of the present disclosure will be described.

First, in general, the brightness of a SAR image varies depending on the roughness of the sea surface. Representative examples of applications of SAR image using such a characteristic include oil spill detection and internal-waves detection. Variations in water depth to the seafloor affect the sea level roughness. This information is represented in SAR image brightness and used in estimating the water depth to the seafloor.

In addition, the fluctuation in the intensity of a micro wave (ripple) at the sea level depending on deep and shallow water depths to the seafloor is caused by tilt modulation and hydrodynamic modulation. Tilt modulation is the effect of the fluctuation in a wave surface slope of a rippling wave on the sea surface. Herein, the crest and the trough of a wave are different in reflectivity, and the influence of the seafloor topography causes a difference in the degree of reflectivity, which is known as hydrodynamic modulation.

In addition, the intensity of a radar reflection wave varies depending on Bragg scattering. When a distance difference between radar waves reflecting off each wave crest at the sea level is ½ of the wavelength of used radar waves, the waves reflecting off each crest cause enhanced interference and the intensity of reflection waves increases. This is known as Bragg resonance.

More specifically, Bragg resonance occurs when the conditional expression shown in [Equation 1] is satisfied, and a small fluctuation in a micro wave on the sea surface affects the degree of Bragg scattering. Thus, a small fluctuation in an ocean condition is detected from a radar wave received through radar.

$$\sin\theta = \frac{\lambda}{2L} \text{ or } L = \frac{\lambda}{2\sin\theta} \quad \text{[Equation 1]}$$

In [Equation 1], L denotes the wavelength of a sea level wave, and $\lambda$ denotes the wavelength of a radar wave.

There are two methods of estimating the water depth to the seafloor using SAR image data. One is to use the intensity of a radar wave based on a difference in tidal flow rate between places with deep and shallow water depths.

That is, the tidal current at a coastal zone is slow at a place with deep water depth and is fast at a place with a shallow water depth. A change in tidal intensity due to a change in water depth cause a change in Bragg condition for a micro wave at the sea level. This effect is represented in the intensity of a SAR radar reflection wave.

In the meantime, a swell wavelength at a coastal zone varies depending on water depth. When the spatial resolution of a SAR image is good enough, the spatial distribution of swell wavelengths is quantitatively determined, and seafloor topography information is estimated therefrom.

More specifically, a water depth estimation method based on a seafloor surface slope and SAR image brightness is as follows. Since in a tidal region, the flow rate is slow at a place with deep water depth and the flow rate is fast at a place with a shallow water depth, the interaction between a change in the tidal flow rate and a micro wave (ripple wave) causes a difference in Bragg scattering. Thus, a spatial change in a radar reflection wave occurs. This information is used to estimate seafloor topography.

Figure 3:
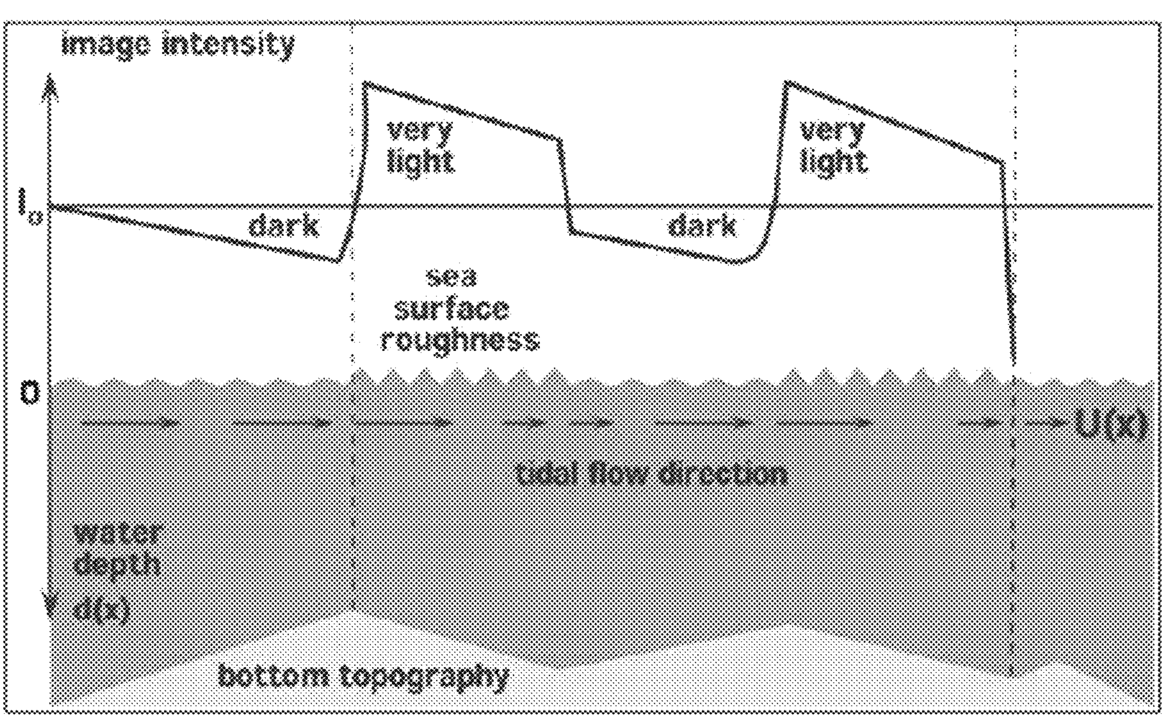
FIG. 3 is a conceptual diagram schematically illustrating a change in SAR image intensity depending on the size of water depth at a tidal region.

That is, referring to FIG. 3, FIG. 3 is a conceptual diagram schematically illustrating a change in SAR image intensity depending on the size of water depth at a tidal region.

As shown in FIG. 3, the data analyzer 12 estimates the state of seafloor topography and measures water depth on the basis of the brightness of an SAR image received through the data collector 11.

That is, the data analyzer 12 estimates the shape of the seafloor topography on the basis of a change in the brightness (i.e., the intensity of a radar reflection wave) of the received SAR image and a change in a tidal rate.

To this end, the data analyzer 12 makes a connection between the water depth and the tidal rate and the brightness of the SAR image and pre-stores the connection as reference data for water depth measurement, and compares the brightness (i.e., the intensity of a radar reflection wave) of the received SAR image and tidal rate information with the reference data to determine water depth.

Herein, details of the method of estimating seafloor topography from a SAR image as described above are obvious to those skilled in the art with reference to existing SAR and SAR image processing apparatuses and methods. Therefore, it should be noted that in the present disclosure, in order to simplify the description, a detailed description of the details will be omitted which are obvious to those skilled in the art from details of the related art as described above or which can be easily understood and implemented by those skilled in the art with reference to a document in the related art.

Next, a water depth estimation method based on a swell propagation characteristic in a shoaling region will be described.

First, the dispersion relation of linear surface gravity waves may be expressed as in [Equation 2].

$$\omega^2 = gk\tanh(kh) \quad \text{[Equation 2]}$$

In [Equation 2], ω denotes the angular frequency (ω=2π/T), g denotes the gravitational acceleration, k denotes the wavenumber (k=2π/L), and h denotes the water depth.

Therefore, if the period (T) and the wavelength (L) of a wave are known, water depth may be calculated from the dispersion relation equation of the surface gravity waves. To this end, a wavelength size for each region needs to be known from a radar image, and the period of a wave needs to be provided from a separate source.

More specifically, in the case of a linear wave, seafloor topography affects the size of wave speed (c=L/T) in a place where the water depth is less than ½ of the wavelength. In the case of a swell wavelength ranging from 150 to 200 m, water depth affects the size of wave speed in a place where the water depth is less than 75 m. Considering this, the water depth to the seafloor that can be estimated using swell wave data of a SAR image is about up to 75 m.

In the meantime, water depth estimation using a SAR image is possible in a place with a very shallow water depth of 10 m or less. That is, near the shoreline with a very shallow water depth, it is impossible to know the wavelength because of a breaking wave. In this region, the dispersion relation of linear waves is inapplicable. Considering this, water depth estimation using a SAR image is usefully applicable in a region with the water depth ranging from about 15 to 75 m.

From the above, a specific method of determining seafloor topography using a linear wave dispersion relation from a radar image can be summarized as follows.

First, the dispersion relation of linear waves may be expressed as in [Equation 2]. If a wave enters a region affected by water depth, as the water depth decreases, the wave speed slows down and the wave amplitude increases and the wave traveling direction is refracted. This phenomenon is called shoaling.

In addition, in the deep-water where the water depth is greater than ½ of the wavelength, a wave is hardly affected by the seafloor topography (i.e., kh=π, tanhh(kh)=1). In a shallow region or a transient region affected by the water depth, the water depth may be expressed as in [Equation 31].

$$h = \frac{1}{k}\tanh^{-1}\left(\frac{\omega^2}{gk}\right) \quad \text{[Equation 3]}$$

Figure 4:
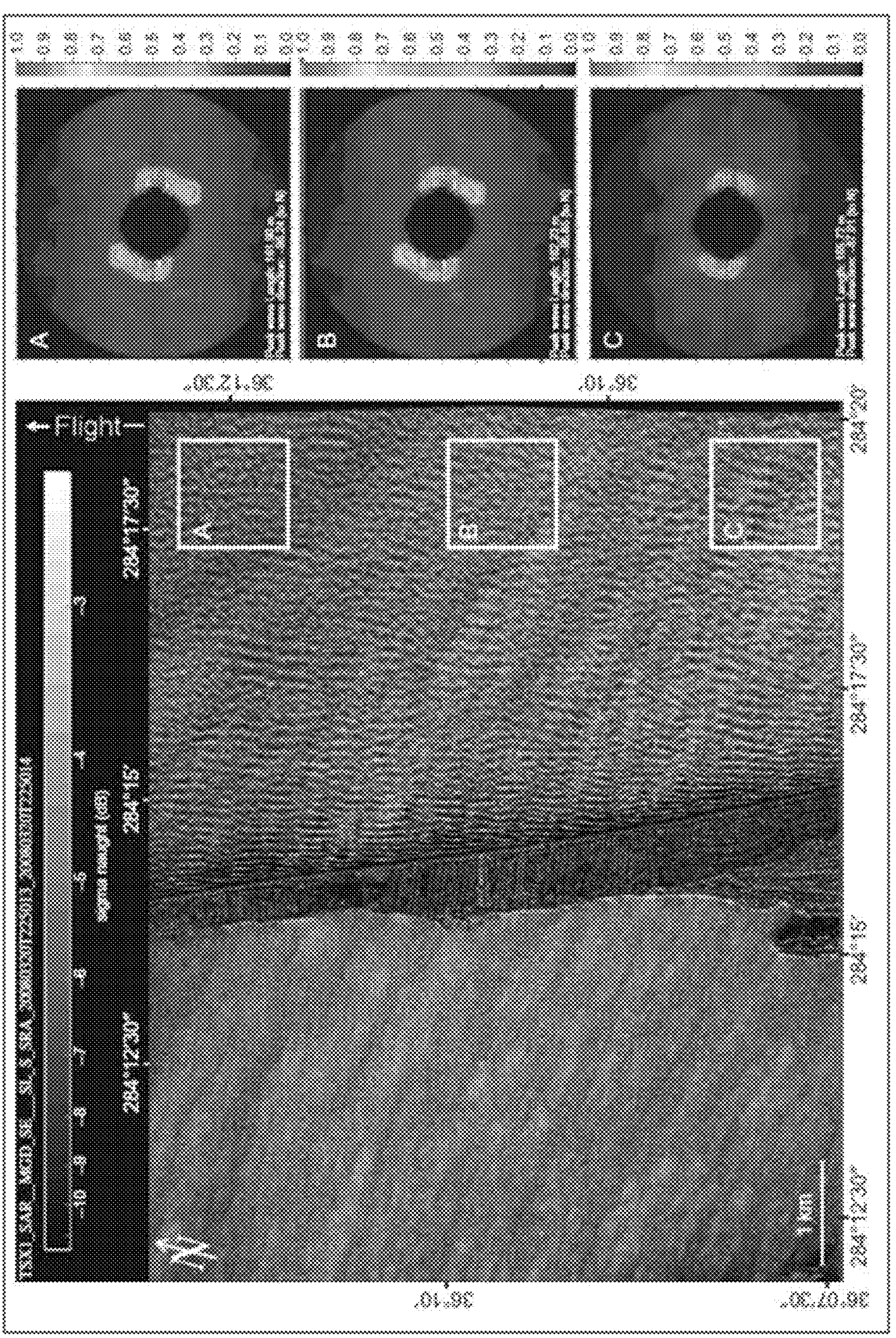
FIG. 4 is a diagram illustrating examples of 2D fast Fourier transform (FFT) spectra for some areas in a marine SAR image.

Next, referring to FIG. 4, FIG. 4 is a diagram illustrating examples of 2D fast Fourier transform (FFT) spectrums for some areas in a marine SAR image.

As shown in FIG. 4, the wavelength of a swell in a local region in a SAR image may be determined using 2D fast Fourier transform (FFT). The wavenumber in a wave traveling direction may be calculated through [Equation 4] from the wavenumber vector components ($k_x$, $k_y$) in the x and y directions determined from the 2D spectrums.

$$k = k_x^2 + k_y^2 \quad \text{[Equation 4]}$$

$$\omega = \frac{2\pi}{\sqrt{k_x^2 + k_y^2}}$$

$$\theta = \tan^{-1}\left(\frac{k_y}{k_x}\right)$$

Herein, regarding a 2D spectrum, peaks appear on both sides in 180-degree directions as shown on the right side of FIG. 4. Which one of these is the actual peak can be immediately determined from the wave shape in the SAR image.

In addition, as described above, in order to find the water depth by applying the dispersion relation equation, a wavelength value extracted from the radar image as well as the period of the wave need to be known. Herein, in principle, the period of the wave is determined from a time-series spectrum observed at a fixed point. However, when image data includes deep-water (where the water depth is greater than ½ of the wavelength), the period (T) may be determined from the wavelength (i.e., a dispersion relation equation (ω) of deep-sea waves) in the deep-water as shown in [Equation 5].

$$\omega = \sqrt{gk} \qquad \text{[Equation 5]}$$

$$T = \sqrt{\frac{2\pi\lambda}{g}}$$

In [Equation 5], the wavelength λ is a value determined from a radar image of a deep-sea region.

Moreover, as described above, water depth determination using a SAR image is possible up to the water depth of ½ of a swell wavelength in principle, and in deep-water, the swell wavelength with the period of 10 to 13 seconds is 150 to 350 m, so the water depth of up to 75 m may be determined from swell wavelength information.

As described above, water depth may be measured from a SAR image. That is, the data analyzer 12 makes a connection between water depth and a tidal rate and the brightness (the intensity of a radar reflection wave) of a SAR image and pre-stores the connection as reference data for water depth measurement. The data analyzer 12 estimates the shape of seafloor topography on the basis of a change in the brightness of a SAR image and a change in a tidal rate received through the data collector 11 and makes comparison with the reference data to measure the water depth in a particular point or region according to predetermined settings.

Alternatively, in a shallow region or a transient region where the water depth is less than ½ of the wavelength and the wave speed affects the water depth, the data analyzer 12 uses [Equation 3] to calculate the water depth (h) on the basis of information on the period (T) and the wavelength (L) of a wave in a measurement region received through the data collector 11 and the dispersion relation equation of surface gravity waves shown in [Equation 2].

In addition, as described above with reference to FIG. 4, the data analyzer 12 applies 2D fast Fourier transform (FFT) to a SAR image received through the data collector 11, and uses [Equation 4] to calculate the wavenumber from the wavenumber vector components ($k_x$, $k_y$) in the x and y directions in the 2D spectrum, and determines the wavelength of a swell in a local region in the SAR image.

Furthermore, when the SAR image includes deep-water where the water depth exceeds ½ of the wavelength, the data analyzer 12 determines the period (T) using [Equation 5].

Accordingly, the system 10 and the method for measuring water depth using radar image processing according to the embodiments of the present disclosure may be realized as described above. Thus, according to the present disclosure, an underwater environment, such as the shape of a seafloor surface, is more accurately recognized through analysis of a SAR image using synthetic-aperture radar (SAR), and more efficient and accurate water depth measurement is achieved for a wide region with a relatively simple configuration and low cost.

As described above, although a system and a method for measuring water depth using radar image processing according to the exemplary embodiments of the present disclosure have been described in detail, the present disclosure is not limited to the contents described above in the above embodiments. Therefore, various modifications, changes, combinations, and substitutions of the present disclosure may be allowed to be changed by those skilled in the art according to a design need and other various factors changed.

What is claimed is:

1. A system for measuring water depth using radar image processing, the system comprising:

a data collector configured to receive predetermined various types of data for water depth measurement, the predetermined various types of data including a SAR image received through a synthetic-aperture radar (SAR) device;

a data analyzer configured to measure water depth at a predetermined particular point or region in the SAR image through image analysis of the SAR image received through the data collector; and an output part configured to output various types of information according to predetermined settings, the various types of information including the various types of data collected through the data collector and processing processes and processing results processed through the data analyzer, wherein the data analyzer is configured to calculate, on the basis of information on a period (T) and a wavelength (L) of a wave in a measurement region received through the data collector and a dispersion relation equation of surface gravity waves, the water depth (h) using Equation below $$h = \frac{1}{k}\tanh^{-1}\left(\frac{\omega^2}{gk}\right)$$

(herein, h denotes the water depth, k denotes a wavenumber (k=2π/L), ω denotes an angular frequency (ω=2π/T), and g denotes gravitational acceleration), wherein the data analyzer is configured to apply 2D fast Fourier transform (FFT) to the SAR image received through the data collector, and calculate the wavenumber from wavenumber vector components ($k_x$, $k_y$) in x and y directions in a 2D spectrum and determine a wavelength of a swell using Equation below $$k = k_x^2 + k_y^2$$

$$\omega = \frac{2\pi}{\sqrt{k_x^2 + k_y^2}}$$

$$\theta = \tan^{-1}\left(\frac{k_y}{k_x}\right)$$

$$\sin\theta = \frac{\lambda}{2L} \text{ or } L = \frac{\lambda}{2\sin\theta}$$

(herein, L denotes a wavelength of a sea level wave, and λ denotes a wavelength of a radar wave).

2. The system of claim 1, further comprising:

a communication part configured to transmit and receive the various types of data by performing communication with an external device including a server or a user terminal, through wired or wireless communication or both; and a controller configured to control overall operation of the system.

3. The system of claim 1, wherein the data collector is configured to include the synthetic-aperture radar (SAR) device, or periodically receive the SAR image according to predetermined settings from the particular or a plurality of the SAR devices installed separately from the system.

4. The system of claim 1, wherein the data collector is configured to receive the SAR image and the predetermined various types of data for water depth measurement including information on sea surface and undersea environments, information on a period (T) and a wavelength (L) of a wave, and current atmospheric temperature, water temperature, wind direction, wind speed, and weather information for the region at which the water depth is to be measured, and store water depth measurement results and respective pieces of the data in the form of a database according to predetermined settings to establish a water depth measurement-related database for each region.

5. The system of claim 1, wherein the data analyzer is configured to make a connection between the water depth and a tidal rate and brightness (an intensity of a radar reflection wave) of the SAR image and pre-store the connection as reference data for water depth measurement, and estimate a shape of seafloor topography on the basis of a change in the brightness of the SAR image and a change in the tidal rate received through the data collector and make comparison with the reference data to measure the water depth in the particular point or region according to predetermined settings.

6. The system of claim 1, wherein the data analyzer is configured to determine, when the SAR image includes deep-water where the water depth exceeds ½ of the wavelength (L), the period (T) using Equation below $$\omega = \sqrt{gk}$$

$$T = \sqrt{\frac{2\pi\lambda}{g}}.$$

7. The system of claim 1, wherein the output part is configured to visually display, through a monitor or a display, the various types of information including the SAR image and the various types of data received through the data collector and the processing processes and the analysis results of the data analyzer.

8. The system of claim 7, wherein the output part is configured to display the various types of information visually through the monitor or the display, and simultaneously convey the various types of information audibly through a voice output means including a speaker.

9. The system of claim 2, wherein the controller is configured to transmit the various types of information including the SAR image and the various types of data received through the data collector and the processing processes and the analysis results of the data analyzer, to the external device including the server or the user terminal through the communication part according to predetermined settings.

10. A method for measuring water depth using radar image processing, the method comprising:

realizing a system for measuring water depth at a particular point or region from a SAR image in a system establishment step; and receiving a SAR image and measuring water depth by using the system in a water depth measurement step, wherein the system for measuring water depth is configured using a system for measuring water depth using radar image processing according to claim 1.

11. A water depth measurement information provision service system, comprising:

water depth measurement information generators configured to establish databases by collecting water depth measurement results and various types of information related to water depth measurement for respective regions;

user terminals for respective users to make requests for information related to water depth measurement and receive corresponding services; and a service server connected to each of the water depth measurement information generators and the user terminals, and configured to receive various types of data including the water depth measurement results from the respective water depth measurement information generators, and provide the corresponding services at the users' requests received from the respective user terminals, wherein the water depth measurement information generators are configured using a system for measuring water depth using radar image processing according to claim 1.

12. The water depth measurement information provision service system of claim 11, wherein the user terminals include personal portable information communication terminals including smartphones or tablet PCs, or information processing devices including PCs or laptop computers, or all.

* * * * *